United States Patent
Wang et al.

(10) Patent No.: US 6,704,367 B1
(45) Date of Patent: Mar. 9, 2004

(54) OPTIMAL DISCRETE LOADING ALGORITHM FOR DMT MODULATION

(75) Inventors: Chin-Liang Wang, Hsinchu (TW); Yuan-Shuo Chang, Hsinchu (TW)

(73) Assignee: Proscend Communications Inc., Hsinchu (TW)

( * ) Notice: Subject to any disclaimer, the term of this patent is extended or adjusted under 35 U.S.C. 154(b) by 652 days.

(21) Appl. No.: 09/625,652

(22) Filed: Jul. 26, 2000

(51) Int. Cl.$^7$ .................................................. H04J 1/00
(52) U.S. Cl. ...................................... 375/260; 370/431
(58) Field of Search .................... 375/260, 264; 370/431

(56) References Cited

U.S. PATENT DOCUMENTS 6,516,027 B1 * 2/2003 Kapoor et al. ............... 375/227
2001/0031016 A1 * 10/2001 Seagraves .................... 375/264

* cited by examiner

*Primary Examiner*—Amanda T. Le (57) ABSTRACT

A discrete loading algorithm maximizes data rate or system performance margin for discrete multitone (DMT) transmission. A preliminary bit assignment for each subchannel is first obtained by optimizing a DMT system with an available bandwidth. The subchannels that receive negative bit assignments are then excluded for further optimization until all the bit assignments are positive. The bit assignment of each subchannel is rounded and a corresponding rounding error is calculated. If the total bit number of the bit assignments are greater than the available bandwidth, the bit assignment of the subchannel having the least rounding error is decreased by one bit. If the total bit number of the bit assignments are smaller than the available bandwidth, the bit assignment of the subchannel having the largest rounding error is increased by one bit.

4 Claims, 6 Drawing Sheets

| Data Rate | Hughes-Hartogs | Chow et al. | Proposed |
|---|---|---|---|
| 1.0 Mbps | 31.410 (dB) | 30.763 (dB) | 31.410 (dB) |
| 1.5 Mbps | 25.957 (dB) | 25.483 (dB) | 25.957 (dB) |
| 2.0 Mbps | 21.616 (dB) | 21.108 (dB) | 21.616 (dB) |
| 2.5 Mbps | 17.928 (dB) | 17.426 (dB) | 17.928 (dB) |
| 3.0 Mbps | 14.679 (dB) | 14.240 (dB) | 14.679 (dB) |
| 3.5 Mbps | 11.737 (dB) | 11.271 (dB) | 11.737 (dB) |
| 4.0 Mbps | 9.0391 (dB) | 8.7198 (dB) | 9.0391 (dB) |
| 4.5 Mbps | 6.5417 (dB) | 6.2110 (dB) | 6.5417 (dB) |
| 5.0 Mbps | 4.2094 (dB) | 3.7955 (dB) | 4.2094 (dB) |
| 5.5 Mbps | 2.0183 (dB) | 1.7921 (dB) | 2.0183 (dB) |
| 6.0 Mbps | -0.0809 (dB) | -0.4544 (dB) | -0.0809 (dB) |

OPTIMAL DISCRETE LOADING ALGORITHM FOR DMT MODULATION

FIELD OF THE INVENTION

The present invention relates to the optimization of transmission bandwidth or discrete multitone modulation (DMT), and more specifically to a discrete loading algorithm for maximizing the system performance or data rate of DMT transmission.

REFERENCES TO RELATED ART

The following is a list of references cited in the disclosure of this invention. For convenience, the reference number of a prior art in the list will be included when the prior art is referred to in the following description.

[1] J. M. Cioffi, "Asymmetric digital subscriber lines," Chapter 34 of the Communications Handbook, Editor-in-Chief, J. D. Gibson, CRC Press in Cooperation with IEEE Press, 1997.

[2] J. M. Cioffi et al., "Very-high-speed digital subscriber lines," IEEE Commun. Mag., vol. 37, pp. 72–79, Apr. 1999.

[3] A. Ruiz, J. M. Cioffi, and S. Kasturia, "Discrete multiple tone modulation with coset coding for the spectrally shaped channel," IEEE Trans. Commun., vol. 40, pp. 1012–1029, Jun. 1992.

[4] T. M. Cover and J. A. Thomas, Elements of Information Theory. Wiley, N.Y., 1991.

[5] J. Campello, "Optimal discrete bit loading for multicarrier modulation system," in Proc. 1998 IEEE Int. Symp. Inform. Theory, MIT, pp. 193, Aug. 1998.

[6] J. Campello, "Practical bit loading for DMT," in Conf. Rec. 1999 IEEE Int. Conf. Commun. (ICC '99), Vancouver, Canada, Jun. 1999, pp. 801–805.

[7] A. Leke and J. M. Cioffi, "A maximum rate loading algorithm for discrete multitone modulation systems," in Conf. Rec. 1997 IEEE Global Telecommun. Conf. (GLOBECOM'97), Phoenix, Ariz., November 1997, pp. 1514–1518.

[8] D. Hughes-Hartogs, "Ensemble modem structure for imperfect transmission media," U.S. Pat. Nos. 4,679,227, (July 1987), 4,731,816 (March 1988), and 4,833,796 (May 1989).

[9] P. S. Chow, Bandwidth Optimized Digital Transmission Techniques for Spectrally Shaped Channels with Impulse Noise. Ph.D. Dissertation, Stanford University, May 1993.

[10] P. S. Chow, J. M. Cioffi, and J. A. C. Bingham, "A practical discrete multitone transceiver loading algorithm for data transmission over spectrally shaped channels," IEEE Trans. Commun., vol. 43, pp. 773–775, Febuary/March/April 1995.

[11] R. F. H. Fischer and J. B. Huber, "A new loading algorithm for discrete multitone transmission," in Conf. Rec. 1996 IEEE Global Telecommun. Conf. (GLOBECOM'96), London, pp. 724–728, November 1996.

[12] American National Standards Institute (ANSI), "Network and Customer Installation Interfaces-Asymmetric Digital Subscriber Line (ADSL) Metallic Interface," Draft American National Standard for Telecommunications, Jun. 12, 1998.

[13] L. M. C. Hoo, J. Tellado, and J. M. Cioffi, "Dual Qos loading algorithms for multicarrier systems," in Conf. Rec. 1999 IEEE Int. Conf. Commun. (ICC'99), Vancouver, Canada, June 1999, pp. 796–800.

BACKGROUND OF THE INVENTION

As the Internet gradually becomes part of our life, the demand for high-speed transmission networks is ever increasing. There have been a number of approaches proposed for improving/constructing the information infrastructure. Among them, asymmetric digital subscriber line (ADSL) technology [1] and very-high-speed digital subscriber line (VDSL) technology [2] are two of the most promising solutions that can provide data rates up to 8 megabits per second and 52 megabits per second respectively over ordinary twisted-pair phone lines from a central office to a customer's premise. For the ADSL service, the discrete multitone modulation (DMT) [1], [3] has been selected as a standard by various standards institutes. Transmission technique using DMT is now also being considered as an international standard for the future VDSL service.

Figure 1:
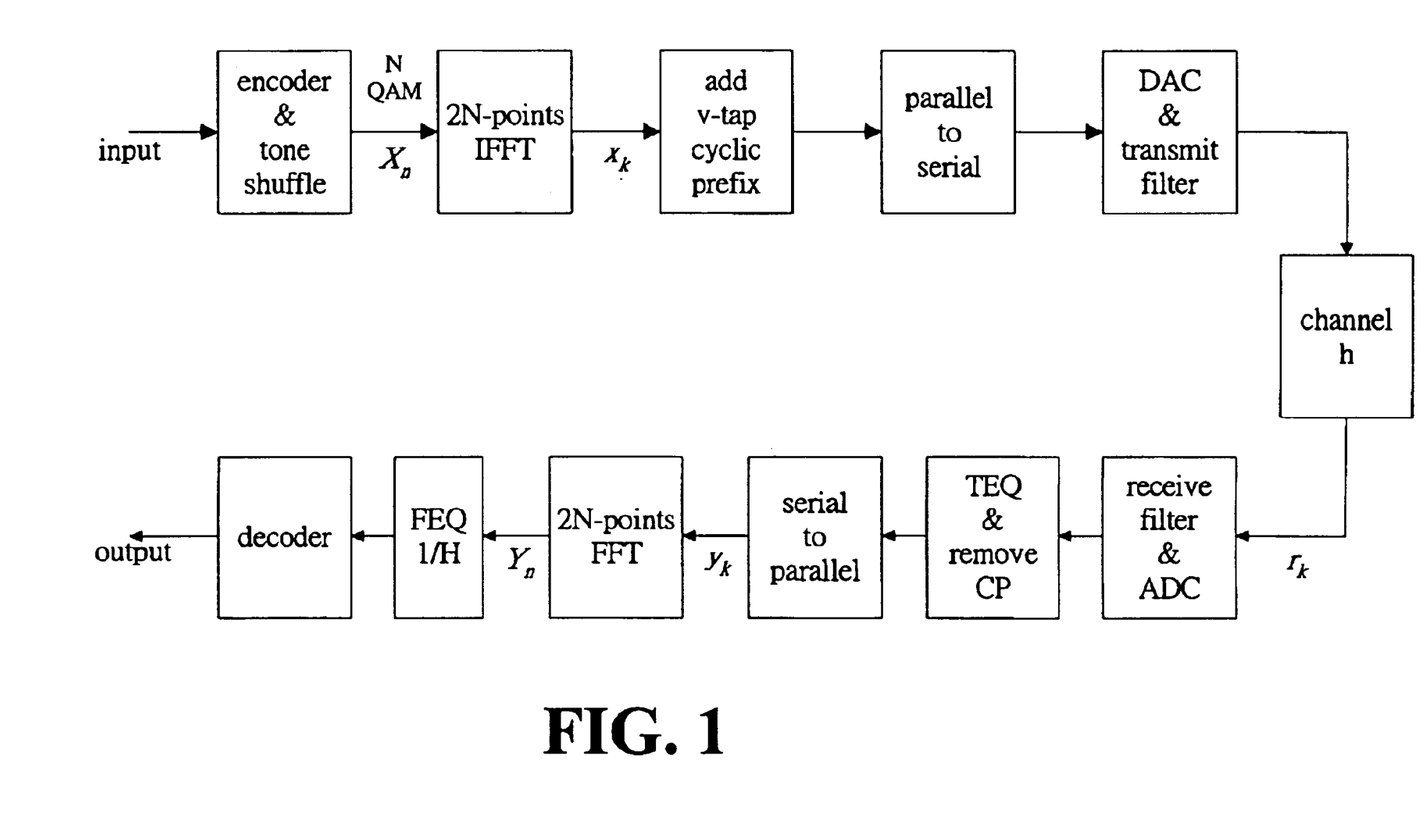
FIG. 1 shows the block diagram of a basic DMT transmission structure.

A basic DMT structure [1] is shown in FIG. 1. At first, the input data stream is encoded, including the use of forward error correcting (FEC) codes, trellis codes (optional), and interleaving. The usable bandwidth of a channel is divided into N subchannels (or tones) that are assumed to be independent. With an appropriate loading algorithm, the data bits to be transmitted are assigned to these N subchannels for transmission, where the bit loading algorithm is trying to optimize the transmission bandwidth based on all the subchannels' conditions.

The data bits assigned to each subchannel are mapped onto QAM constellation to form a complex sample, and then the resulting N complex samples from the N subchannels are extended to be a 2N-point complex-conjugate symmetric sequence. This 2N-point complex sequence is further modulated by the 2N-point inverse fast Fourier transform (IFFT) to generate 2N-point real samples for transmission through the channel. In order to overcome severely intersymbol interference (ISI) and to make the transmitted signals look periodic, the last v samples of each 2N-sample block are circularly wrapped to prefix the block itself. After receiving the signals transmitted, the receiver discards the first v samples, and then the remaining received samples are demodulated by the 2N-point FFT. The resulting transform samples are further processed by a frequency-domain equalizer (FEQ) and a memoryless decoder to recover the original data bits.

The problem of optimizing the transmission bandwidth was first solved by Shannon in 1948 [4], known as "water-filling" method, but the corresponding method is impractical to be implemented for the DMT system due to its high complexity and infinite-granularity in the constellation size. To overcome this problem, several discrete loading algorithms have been proposed for an optimal or suboptimal solution in the finite-granularity constellation case. Basically, these algorithms can be classified into two categories [5], [6]:

(1) Bit Rate Maximization Problem (BRMP)—Maximize the data rate subject to power and system performance margin constraints, i.e., $$\max \sum_{n=1}^{N} b_n \quad (1)$$

subject to $$\sum_{n=1}^{N} p_n(b_n) \leq p \quad (2)$$

where $b_n$ is the number of bits that are transmitted on the $n^{th}$ tone, $p_n$ id the power distribution required to transmit $b_n$ bits on the $n^{th}$ tone, and p is the total power constraint.

(2) Margin Maximization Problem (MMP)—Maximize the system performance margin subject to power and data rate constraints, i.e., $$\min \sum_{n=1}^{N} p_n(b_n) \quad (3)$$

subject to $$\sum_{n=1}^{N} b_n = B \quad (4)$$

where $p_n$ is a function of $b_n$ and B is the data rate constraint.

The optimal discrete loading algorithm presented by Leke and Cioffi [7] is of BRMP type. It utilizes the water-filling solution to determine the turned-on subchannels first, and then assigns energy to each turned-on subchannel using the water-filling distribution to maximize the data rate. The Hughes-Hartogs loading algorithm [8] can be regarded as BRMP type or MMP type, depending on the constraint used. This algorithm assigns one additional bit to the subchannel that needs the least energy until the data rate or power constraint is met. It gives an optimal discrete solution but its computational complexity becomes impractical when the number of bits to be transmitted per DMT symbol is large.

The suboptimal discrete loading algorithm proposed by Chow, Cioffi, and Bingham [9], [10] is of MMP type. It distributes the data bits among all the usable subchannels according to a well-known formula, and then assigns energy to each usable subchannel with the flat distribution. Due to the use of the flat-energy distribution, this loading algorithm suffers some performance degradation as compared to the Hughes-Hartogs algorithm but it involves less computational complexity. In another prior art [11], Fischer and Huber paid their attention on minimizing the error probability of transmission (equivalent to MMP) and derived a closed form to distribute the bits among those usable subchannels. Like the algorithm described in [9] and [10], this method adopts the flat-energy distribution for bit loading and is suboptimal but it has a slight improvement in performance.

Campello [6] proposed a discrete loading algorithm that attempts to maximize the data rate (BRMP) or the system performance margin (MMP) at a given constraint. This algorithm first finds an initial bit distribution for the subchannels appropriately, and then approaches the optimal solution using the Hughes-Hartogs method. It is actually a suboptimal algorithm but has less complexity than those previous algorithms.

From the forgoing discussion, it is understandable that there is strong need in finding an optimal algorithm for maximizing the system performance or data rate for DMT transmission.

SUMMARY OF THE INVENTION

The present invention has been made to overcome the above mentioned drawbacks of conventional discrete loading algorithms for DMT modulation. The primary object of the invention is to provide a method of discrete bit-loading algorithm to optimize the performance or data rate of transmission. It is also an object of the invention to provide a discrete bit-loading algorithm that is computationally efficient for DMT modulation.

In the present invention, a continuous bit distribution scheme that provides the same solution as the water-filling solution for DMT transmission is first derived. The bit distribution is then rounded appropriately to form an integer bit distribution that is also optimal in the discrete case. A method for implementing the discrete bit distribution algorithm with high-performance and low-complexity features is presented. The algorithm is well suited to practical high-speed DMT applications, such as the ADSL and VDSL services over existing twisted-pair phone lines.

Accordingly, the present invention determines a preliminary bit assignment for each subchannel by optimizing a DMT system with N carriers for transmission over an additive white Gaussian channel given an available bandwidth assuming that all subchannels are turned on. The subchannels that receive negative bit assignments are then excluded, and the procedure for determining the bit assignments is repeated until all the bit assignments are positive for the remaining turned-on subchannels.

The bit assignment of each subchannel is rounded and a corresponding rounding error is calculated. If the total bit number of the bit assignments is greater than the target data rate (or the data rate constraint), the bit assignment of the subchannel having the least rounding error is decreased by one bit. If the total bit number of the bit assignments is smaller than the target data rate, the bit assignment of the subchannel having the largest rounding error is increased by one bit.

When the total bit number of the bit assignments is identical to the available bandwidth, transmission power is distributed to each channel according to a power distribution formula. If the total power distributed is greater than the power constraint of the system, the power constraint has to be loosed. On the other hand, if the total power distributed is less than the power constraint of the system, the excess power can be uniformly distributed to each subchannel. The excess power can also be distributed by assigning one additional bit to a subchannel that has the largest rounding error repeatedly until the power constraint is met.

The algorithm of the present invention can maximize the system performance margin or the data rate, depending on the constraints that are put on the system. As compared to the optimal algorithm proposed by Hughes-Hartogs [8], the present invention achieves the same performance with much less complexity. It also has advantages over the suboptimal algorithm described by Chow, Cioffi, and Bingham [9], [10] in terms of both performance and complexity.

DESCRIPTION OF THE PREFERRED EMBODIMENTS

The present invention presents a practical DMT discrete loading algorithm to optimize transmission bandwidth. The algorithm of the invention can adopt any one of the optimal criteria described in the background section and has the advantage of being more computationally efficient.

For a given bit error rate, the present invention finds a method for arranging the power, date rate, and system performance margin appropriately such that the DMT transmission bandwidth is optimized. The main idea of the algorithm in the present invention is to determine a bit distribution for all DMT subchannels that requires the minimum transmission power under a fixed data rate and a fixed system performance margin. After this bit distribution has been done, the excess power is further reallocated (i.e., the difference between the power constraint and the minimum transmission power mentioned above) to promote the system performance margin (MMP) or data rate (BRMP) at user's choice.

Consider a DMT system with N carriers for transmission over an additive white Gaussian (AWGN) channel. As described in [9], such a system can be (approximately) regarded as an aggregate of transmission over N parallel intersymbol interference free quadrature amplitude modulation subchannels, where the number of bits that the nth subchannel can support is given as $$b_n = \log_2\left(1 + \frac{p_n \cdot g_n}{\Gamma \cdot r_n}\right) \quad (5)$$

where $g_n$ is the signal-to-noise ratio (SNR) on the nth subchannel with unit input power, $p_n$ is the required power to afford $b_n$ bits over the nth subchannel, $\Gamma$ is the SNR gap measuring how far the system is away from achieving the channel capacity, and $r_n$ is the system performance margin. Note that $\Gamma$ will be chosen appropriately to be a constant based on the desired bit error rate such that none of the subchannels will dominate the system performance. Without loss of generality, $r_n$ is set to 1 to obtain $$p_n = \frac{\Gamma \cdot (2^{b_n} - 1)}{g_n} \quad (6)$$

With all the above assumptions, the problem of finding a bit distribution for the set of N subchnnels that minimizes the total transmission power is equivalent to minimizing $$P_{used} = \sum_{n=1}^{N} p_n = \sum_{n=1}^{N} \frac{\Gamma \cdot (2^{b_n} - 1)}{g_n} \quad (7)$$

$$\sum_{n=1}^{N} b_n = B.$$

Using Lagrange multipliers for this optimization problem, a modified cost function can be defined as follows:

$$J = \sum_{n=1}^{N} \frac{\Gamma \cdot (2^{b_n} - 1)}{g_n} + \lambda\left(\sum_{n=1}^{N} b_n - B\right) \quad (8)$$

where $\lambda$ is the Lagrange multiplier. Differentiating (8) with respect to $b_n$ and $\lambda$ and letting the results equal to zero, one can obtain $$\frac{2^{b_n}}{g_n} = K(\text{const.}) \quad (9)$$

Since (9) holds for all the subchannels (n=1, 2, ... N), the following equation can be written:

$$\left(\frac{2^{b_n}}{g_n}\right)^N = (K)^N = \prod_{i=1}^{N} \frac{2^{b_i}}{g_i} = 2^B \prod_{i=1}^{N} \frac{1}{g_i} \quad (10)$$

From (10), it can be rewritten as $$2^{b_n N} = 2^B \cdot (g_n)^N \cdot \prod_{n=1}^{n} \frac{1}{g_i} \quad (11)$$

Thus, $$b_n = \frac{B}{N} - \frac{1}{N}\sum_{i=1}^{N} \log_2(g_i) + \log_2(g_n) \quad (12)$$

With (12), one can obtain a preliminary bit distribution, where the bit assignment $b_n$ for subchannel n may not be positive. To make the power more efficiently used, one can make the following modifications: 1) excluding (or turning off) those subchannels with zero or negative bit assignments (i.e., $b_n \leq 0$) in the bit distribution, and 2) reapplying (12) to the remaining subchannels to determine a new bit distribution, where the parameter N is changed to be N' representing the number of the remaining subchannels. The above modification procedure is repeated until all the bit assignments $b_n$'s are positive. After this bit distribution has been done, the power for the turned-on subchannels is further distributed according to (6) and (9). It is easy to verify that the resulting power distribution is as follows:

$$p_n = \Gamma \cdot \frac{2^{b_n}}{g_n} - \frac{\Gamma}{g_n} = K'(\text{const.}) - \frac{\Gamma}{g_n} \quad (13)$$

It is worth noting that the power distribution derived is the same as the water-filling solution for a set of parallel channels. It should also be noted that if the total power required is greater than the given power constraint, the power constraint must be loosed properly or declare that the channel cannot support the target data rate under the given power constraint. If the total power required is less than the given power constraint, one can either uniformly distribute the excess power to all the turned-on subchannels or enhance the bit distribution based on the excess power by assigning one additional bit to the subchannel that needs the least energy until the power constraint is met. When the former approach is adopted, the proposed bit distribution is of MMP type. On the other hand, it is of BRMP type if the latter approach is used.

Figure 6:
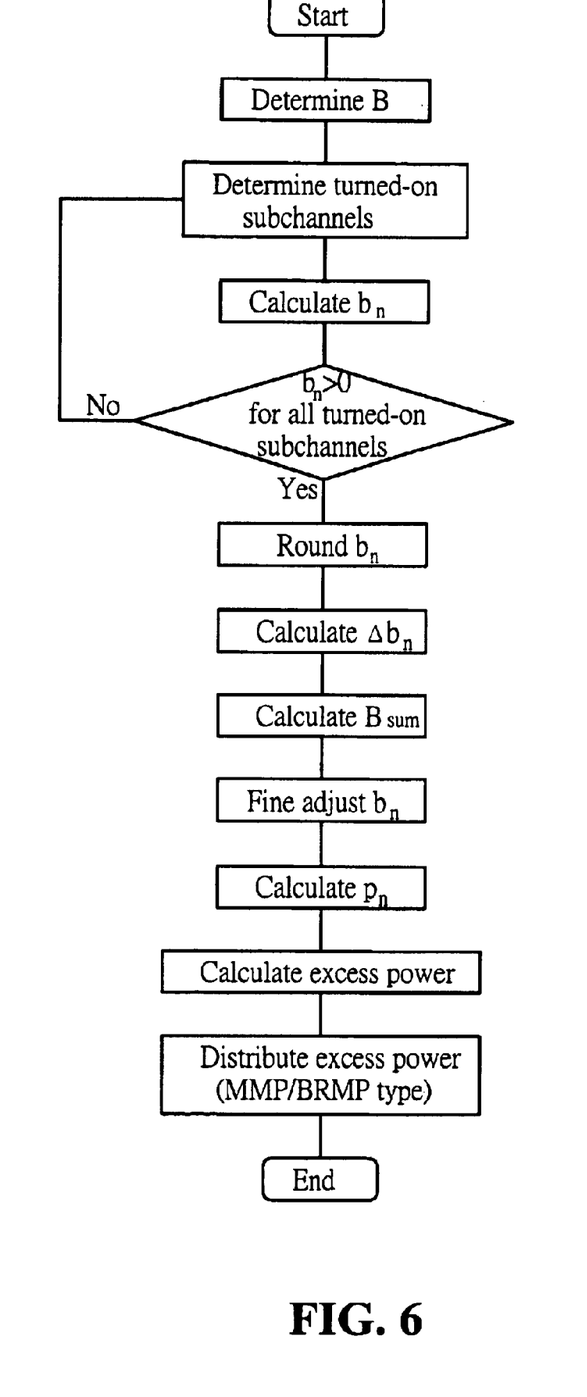
FIG. 6 shows the flow chart of the discrete loading algorithm according to the present invention.

The bit-loading algorithm that has been described so far is optimal under the assumption of infinite granularity in the constellation size which is not realizable in practice. To overcome this problem, the algorithm has to be modified properly for the finite-granularity case. FIG. 6 shows the flow chart of the algorithm according to the present invention. Following the rounding procedure described in [9] and [10], the discrete version of the loading algorithm of the present invention can be summarized as follows:

1. Initialize the turned-on subchannels: $N_{on}=N$ and $C_{on}=\{1, 2, \ldots, N\}$.
2. Calculate $b_n$ according to (12) for all $n \in C_{on}$. Exclude all subchannels with $b_n \leq 0$ from $C_{on}$ and determine the resulting $N_{on}$. This step is repeated until all $b_n$'s of the turned-on subchannels are positive.
3. Round all $b_n$'s of the turned-on subchannels to be integers and calculate the rounding error:

$$b_{Qn} = \text{round}(b_n) \quad (14)$$

$$\Delta b_n = b_n - b_{Qn} \quad (15)$$

where round(.) is the rounding function.
4. Let $$B_{sum} = \sum_{n \in C_{on}} b_{Qn}.$$

If $B_{sum} < B$, subtract one bit from the bit assignment of subchannel n with the smallest $\Delta b_n$ and calculate $B_{sum} = B_{sum} - 1$.
5. If $B_{sum} < B$, add one bit to subchannel n with the largest $\Delta b_n$ and calculate $B_{sum} = B_{sum} + 1$.
6. If $B_{sum} = B$, distribute the power according to a modified version of (13) given as follows:

$$p_n = \frac{\Gamma \cdot (2^{b_{Qn}} - 1)}{g_n} \quad (16)$$

7. Let $$p_{sum} = \sum_{n=C_{on}} p_n.$$

If $p_{sum}$>power constraint, the power constraint must be loosed properly or declare that the channel cannot support the target data rate under the given power constraint.
8. If $p_{sum}$<power constraint, the excess power can be distributed uniformly to all the turned-on subchannels (MMP type) or enhance the bit distribution based on the excess power by assigning one additional bit to subchannel n that needs the least energy until the power constraint is met (BRMP type).

Since the power distribution derived for the continuous constellation case is the same as the water-filling solution and rounding the continuous water-filling solution will result in an optimal discrete solution [5], [13], the discrete loading algorithm presented above is an optimal one.

The following description presents a comparison of complexity of the optimal discrete loading algorithm of this invention with the previous optimal or suboptimal discrete loading algorithms described by Hughes-Hartogs [8] and Chow, Cioffi, and Bingham [9], [10]. For the method described in [8], a table of incremental energies required to assign one additional bit on each subchannel needs to be computed. It is then sorted and searched for the subchannel that requires the least incremental energy for each bit. It can be seen that the computational complexity of the Hughes-Hartogs method is O(B×N). Such computational complexity would be too high to be realizable for ADSL applications where N is equal to 256 and B is up to 1500. The method proposed in [9] and [10] involves O($\log_2$ N) iterations to determine the turned-on subchannels and compute the associated bit distribution based on the following equation:

$$b_n = \log_2\left(1 + \frac{SNR_n}{\Gamma + r_n(\text{dB})}\right) \quad (17)$$

By neglecting the addition operations, each iteration requires approximately N divisions and N logarithm operations. The computational complexity of this part is O(N $\log_2$ N). In addition to this, the algorithm in [9] and [10] needs to compute the power distribution based on a similar equation to (16), where the computational complexity is O(N). In contrast, the present algorithm involves O($\log_2$ N) iterations to determine the turned-on subchannels and compute the associated bit distribution given by (12), where the first iteration requires approximately one division and N logarithm operations and each of the other iterations requires approximately only one division. Like the algorithm described in [9] and [10], the algorithm in this invention involves O(N) complexity to compute the power distribution based on (16). It is clear that the optimal algorithm of this invention is more computationally efficient than those previous optimal or suboptimal algorithms described in [8]–[10].

Figure 2:
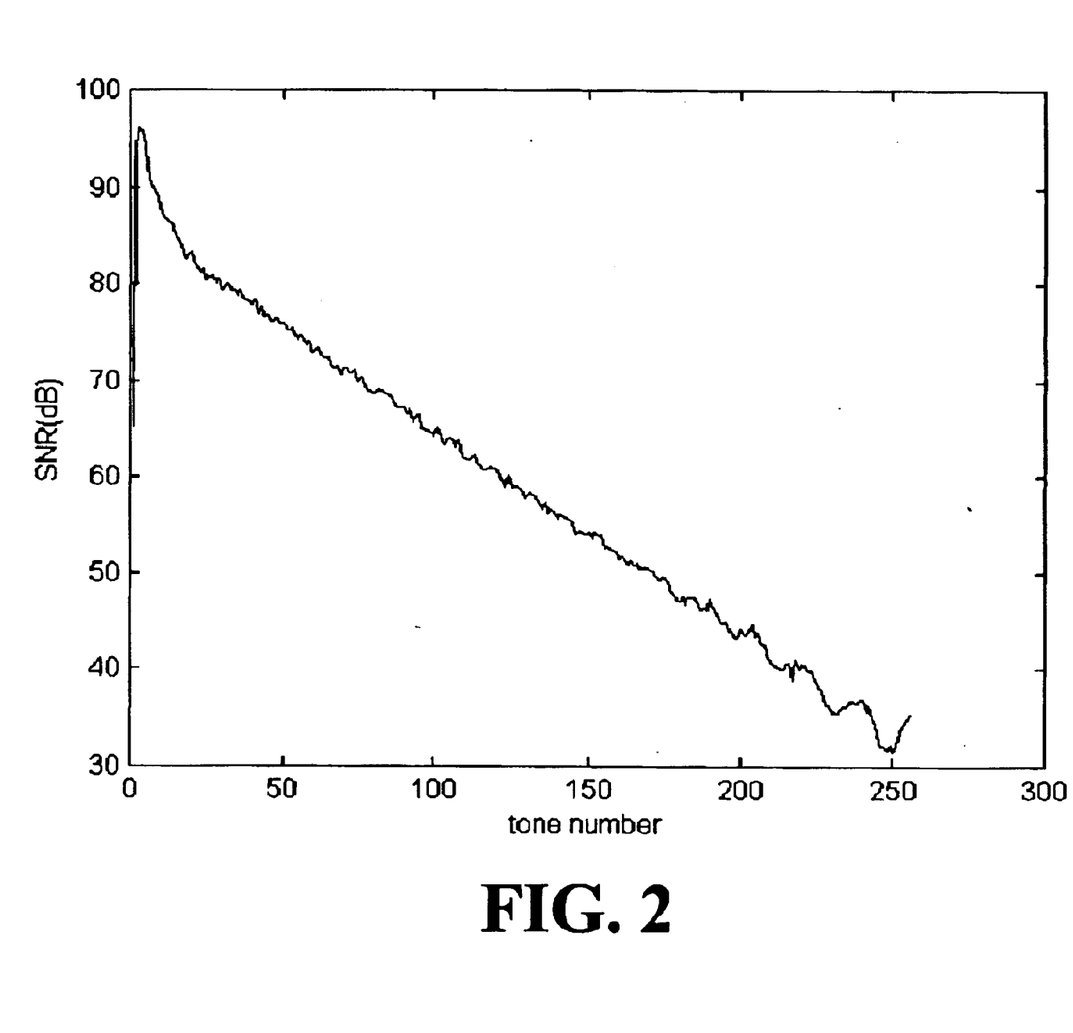
FIG. 2 shows the received SNR plot for the CSA loop 6 with 24 ADSL FEXT+24 ADSL NEXT+AWGN.

To verify the performance of the optimal discrete loading algorithm of this invention, a number of simulations for the MMP case are performed. For the purpose of comparison, the optimal algorithm by Hughes-Hartogs [8] and the suboptimal algorithm by Chow, Cioffi, and Bingham [9], [10] were also simulated. In the simulations, all the algorithms are tested on the canonical ADSL carrier-serving-area (CSA) loop 6 [12] in the downstream direction with 24 ADSL downstream far-end crosstalk (FEXT), 24 ADSL upstream near-end crosstalk (NEXT), and −140 dB/Hz AWGN. FIG. 2 shows the received SNR plot of the CSA loop 6 with unit input power. The transmission performance required is to distribute 100 mW power on the CSA loop 6 with a given data rate and a bit error rate constraint of $10^{-7}$ for each turned-on subchannel.

Figure 3:
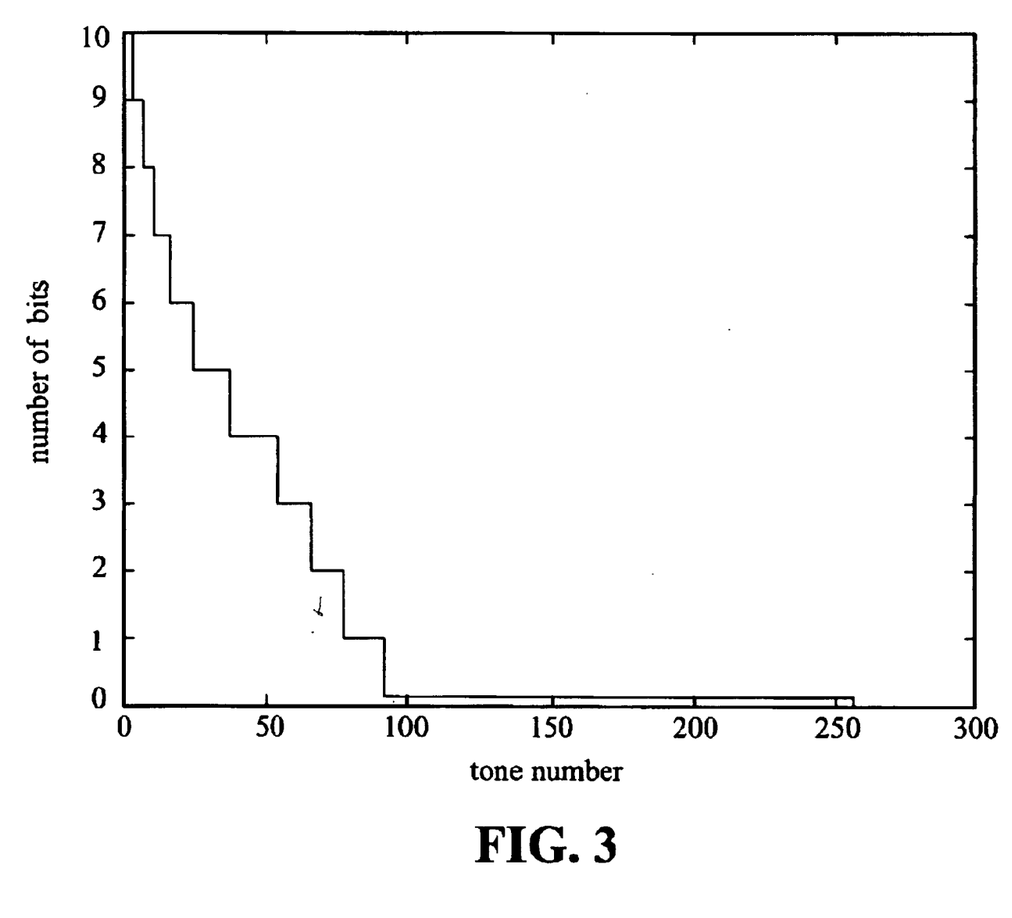
FIG. 3 shows the bit distribution generated by the algorithm of this invention for the CSA loop 6 with a data rate of 1.5 Mbps.
Figure 4:
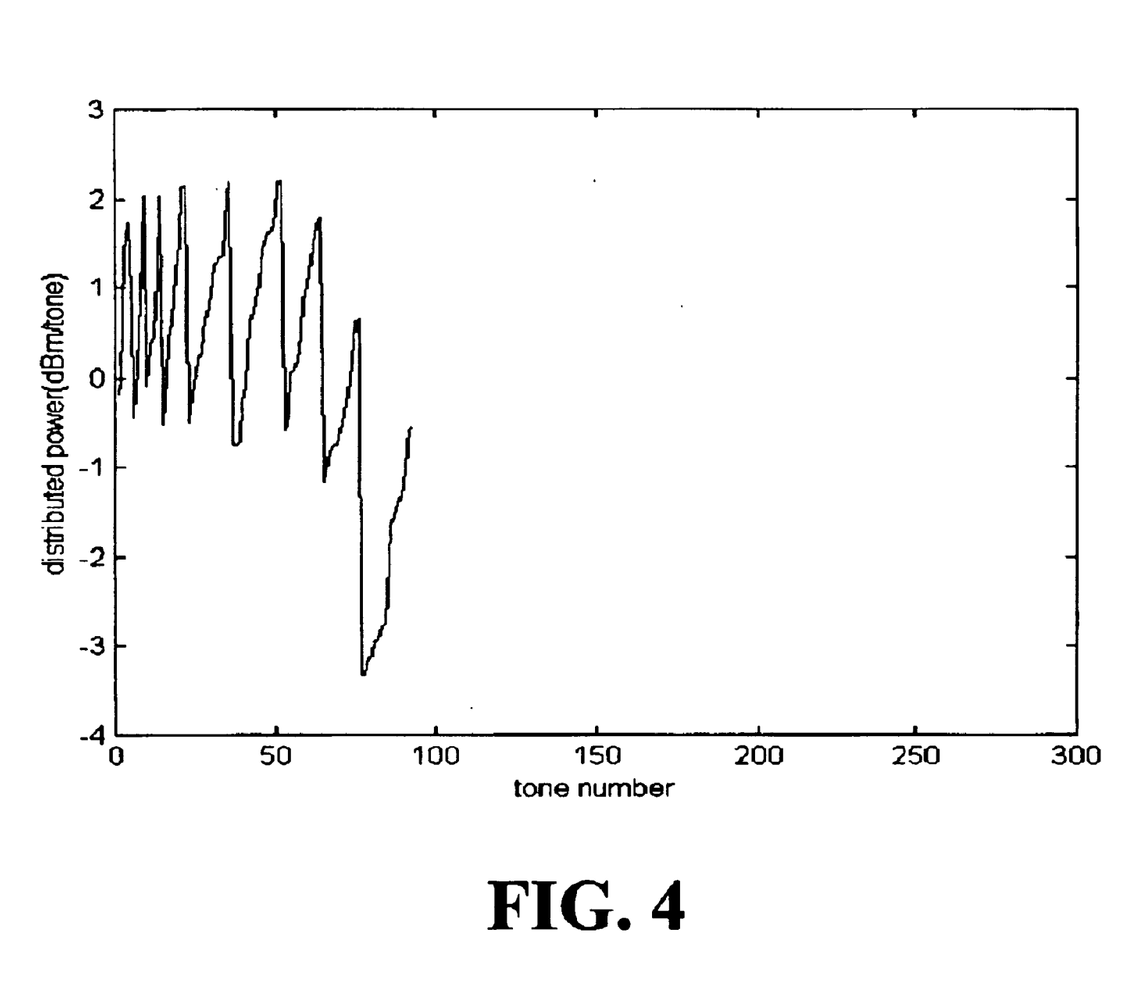
FIG. 4 shows the power distribution generated by the algorithm of this invention for the CSA loop 6 with a data rate of 1.5 Mbps.
Figure 5:
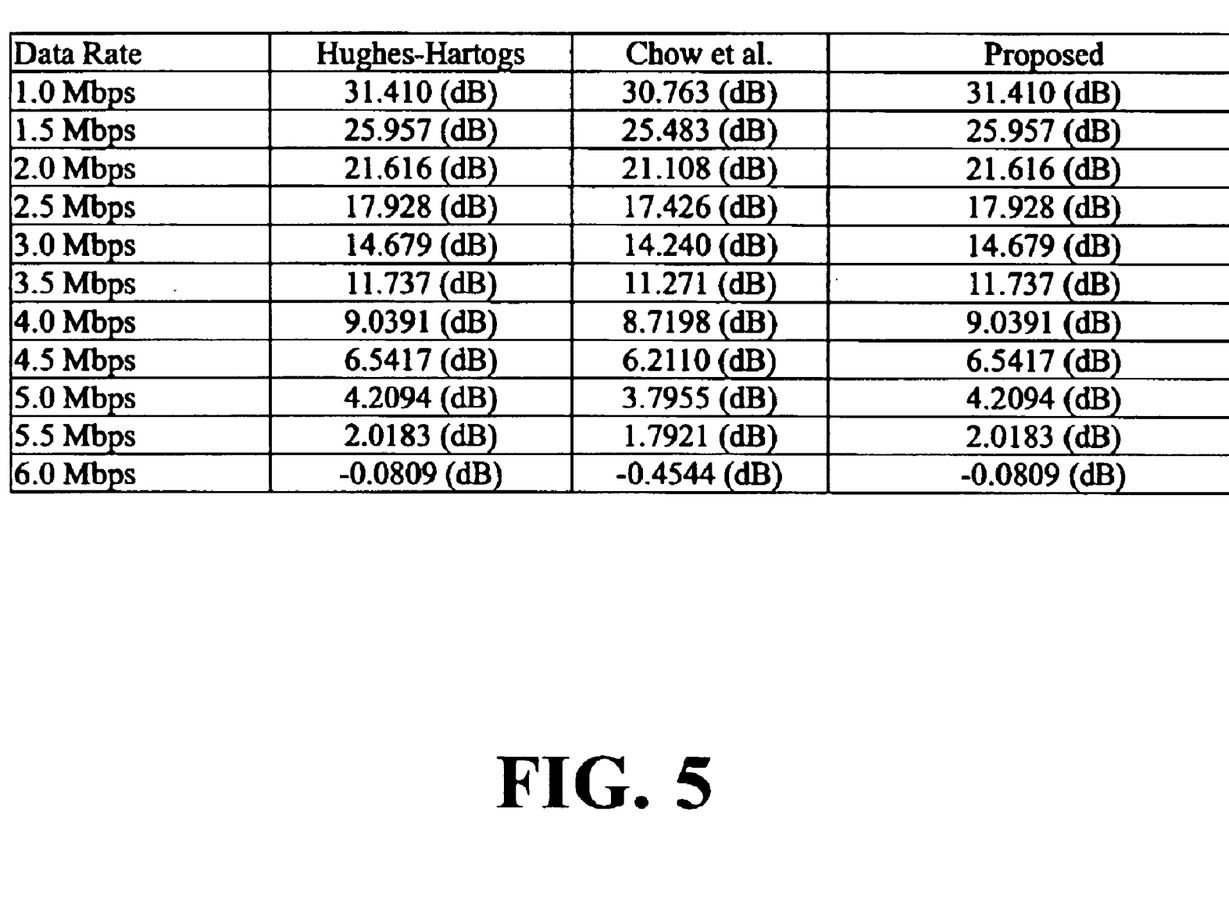
FIG. 5 shows the comparison of system performance margin for different methods.

The bit distribution and power distribution for the date rate of 1.5 Mbps generated by the loading algorithm of this invention are shown in FIGS. 3 and 4. FIG. 5 shows a table that lists the performance margins for all the algorithms simulated with data rates ranging from 1 Mbps to 6 Mbps. From these simulation results, it can be seen that the algorithm of this invention reaches the same performance as the optimal one proposed by Hughes-Hartogs [8], which is better than that of the suboptimal one by Chow, Cioffi, and Bingham [9], [10]. This further supports that the discrete loading algorithm of the present invention is optimal.

Although only the preferred embodiments of this invention were shown and described in the above description, numerous changes in the detailed construction and combination as well as arrangement of parts may be restored to without departing from the spirit or scope of the invention as hereinafter set forth in the appended claims. It is requested that any modification or combination that comes within the spirit of this invention be protected.

What is claimed is:
1. A method of bit-loading for discrete multitone modulation in a data communication channel having a data rate constraint B and N subchannels for transmission, comprising the steps of:
 a. initializing each subchannel as a turned-on subchannel, and the total number of all turned-on subchannels as $N_{on}=N$;
 b. calculating the number of bits assigned to a subchannel for each turned-on subchannel according to $$b_n = \frac{B}{N_{on}} - \frac{1}{N_{on}} \sum_{i=1}^{N_{on}} \log_2(g_i) + \log_2(g_n),$$

wherein n is a subchannel number of a turned-on subchannel having a signal-to-noise ratio $g_n$ with unit input power, and $$\sum_{i=1}^{N_{on}}$$

represents summation over all currently turned-on subchannels;
 c. executing step e. if each turned-on subchannel has a positive number of bits calculated in step b.; otherwise, executing step d.;
 d. excluding all subchannels having a negative number of bits calculated in step b., updating the total number of turned-on channels $N_{on}$ and returning to step b.;
 e. rounding $b_n$ of each turned-on subchannel to an integer $b_{Qn}$ and calculating a corresponding rounding error $\Delta b_n = b_n - b_{Qn}$;
 f. computing $B_{sum}=$ $$B_{sum} = \sum_{n \in C_{on}} b_{Q_n},$$

wherein $$\sum_{n \in C_{on}}$$

represents summation over all turned-on subchannels;
 g. selecting a least-error subchannel having a smallest rounding error, subtracting one bit from the number of bits assigned to said least-error subchannel and subtracting one from $B_{sum}$ if $B_{sum}>B$;
 h. selecting a most-error subchannel having a largest rounding error, adding one bit to the number of bits assigned to said most-error subchannel and adding one to $B_{sum}$ if $B_{sum}<B$; and
 i. distributing power to each turned-on subchannel according to $$p_n = \frac{\Gamma \cdot (2^{b_{Q_n}} - 1)}{g_n} \text{ if } B_{sum} = B,$$

wherein $\Gamma$ is a pre-determined constant and $P_n$ is the power distributed to an nth subchannel.

2. The method of bit-loading for discrete multitone modulation according to claim 1, wherein said data communication channel further has a power limit, and said method further comprises the steps of:
 j. computing $P_{sum}=$ $$p_{sum} = \sum_{n \in C_{on}} p_n,$$

wherein $$\sum_{n \in C_{on}}$$

represents summation over all turned-on subchannels; and
 k. declaring that said data communication channel can not satisfy said power limit or increasing said power limit if $p_{sum}$ is greater than said power limit.

3. The method of bit-loading for discrete multitone modulation according to claim 2, said method further comprising the steps of:
 l. distributing excess power uniformly to each turned-on subchannels if $p_{sum}$ is smaller than said power limit.

4. The method of bit-loading for discrete multitone modulation according to claim 2, said method further comprising the steps of:
 m. distributing excess power by assigning one additional bit to a subchannel that has least incremental energy if $p_{sum}$ is smaller than said power limit;
 n. computing updated $$p_{sum} = \sum_{n \in C_{on}} p_n,$$

wherein $$\sum_{n \in C_{on}}$$

represents summation over all turned-on subchannels; and
 o. returning to step m. if the updated $p_{sum}$ is smaller than said power limit.

* * * * *